(12) United States Patent
Seo et al.

(10) Patent No.: US 11,687,484 B2
(45) Date of Patent: Jun. 27, 2023

(54) ELECTRONIC DEVICE AND OPERATION METHOD THEREOF

(71) Applicant: SAMSUNG ELECTRONICS CO., LTD., Suwon-si (KR)

(72) Inventors: Jehwan Seo, Suwon-si (KR); Geunsam Yang, Suwon-si (KR); Hyungyong Lee, Suwon-si (KR); Yongjin Kang, Suwon-si (KR); Sanggi Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 47 days.

(21) Appl. No.: 17/513,426

(22) Filed: Oct. 28, 2021

(65) Prior Publication Data
US 2022/0129406 A1    Apr. 28, 2022

Related U.S. Application Data

(63) Continuation of application No. PCT/KR2021/012517, filed on Sep. 14, 2021.

(30) Foreign Application Priority Data

Oct. 28, 2020  (KR) .................. 10-2020-0141462

(51) Int. Cl.
*G06F 13/42* (2006.01)
*G06F 13/38* (2006.01)

(52) U.S. Cl.
CPC ........ *G06F 13/4282* (2013.01); *G06F 13/382* (2013.01); *G06F 2213/0042* (2013.01)

(58) Field of Classification Search
CPC ....................................................... G06F 1/32
See application file for complete search history.

(56) References Cited

U.S. PATENT DOCUMENTS 6,131,135 A * 10/2000 Abramson ............ G06F 13/362
                                                                710/63
7,152,171 B2   12/2006 Chandley et al.
(Continued)

FOREIGN PATENT DOCUMENTS

JP      2005165509 A    6/2005
JP       201320297 A    1/2013
(Continued)

OTHER PUBLICATIONS

International Search Report (PCT/ISA/210) and Written Opinion (PCT/ISA/237) dated Dec. 23, 2021 issued by the International Searching Authority in International Application No. PCT/KR2021/012517.

(Continued)

*Primary Examiner* — Henry Tsai
*Assistant Examiner* — Juanito C Borromeo
(74) *Attorney, Agent, or Firm* — Sughrue Mion, PLLC

(57) ABSTRACT

An electronic device includes a first processor, a second processor; and a communication interface. The second processor transmits, via a hardware wire, state information indicating a state of the first processor to the communication interface; and based on the first processor entering a suspend mode from a normal mode, change the state information from a first value to a second value, and the communication interface, based on the state information being changed, disconnects the first processor from the communication interface by turning off power of an universal serial bus (USB) interface. Moreover, the second processor, based on the first processor entering the normal mode from the suspend mode, changes the state information from the second value to the first value, and the communication interface, based on the state information being changed, (Continued)

connects the first processor to the communication interface by turning on the power of the USB interface.

15 Claims, 12 Drawing Sheets

(56) References Cited

U.S. PATENT DOCUMENTS

| | | |
|---|---|---|
| 8,166,221 B2 | 4/2012 | Lee et al. |
| 9,736,326 B2 | 8/2017 | Park et al. |
| 11,038,547 B2 | 6/2021 | Lee et al. |
| 2013/0203463 A1 | 8/2013 | Kent et al. |

FOREIGN PATENT DOCUMENTS

| | | |
|---|---|---|
| KR | 1020080043463 A | 5/2008 |
| KR | 101203145 B1 | 11/2012 |
| KR | 101436593 B1 | 9/2014 |
| KR | 1020180013099 A | 2/2018 |
| KR | 11020190000045 A | 1/2019 |

OTHER PUBLICATIONS

Wikipedia, "USB 3.0," https://ko.wikipedia.org/wiki/USB_3.0, Last edited Jul. 21, 2021, total 13 pages.

* cited by examiner

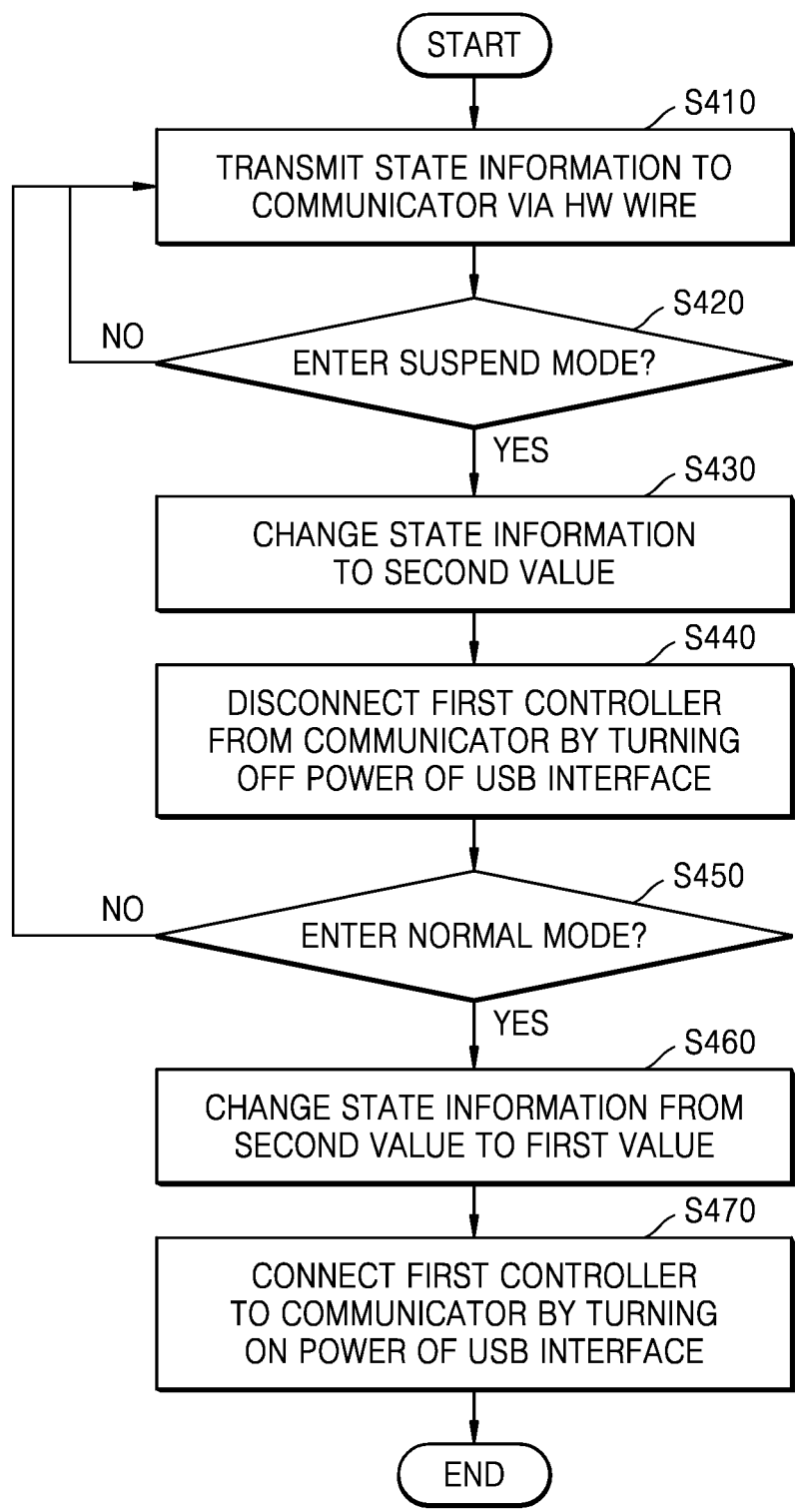

ELECTRONIC DEVICE AND OPERATION METHOD THEREOF

CROSS-REFERENCE TO RELATED APPLICATION(S)

This application is a by-pass continuation application of International PCT Application No. PCT/KR2021/012517 filed Sep. 14, 2021, which is based on and claims priority to Korean Patent Application No. 10-2020-0141462 filed Oct. 28, 2020, in the Korean Intellectual Property Office, the disclosures of which are incorporated by reference herein in their entirety.

BACKGROUND

1. Field

The disclosure relates to an electronic device and an operation method thereof, and more particularly, to an electronic device for connecting a processor in the electronic device to a communication interface via a universal serial bus (USB) interface.

2. Description of Related Art

Universal Serial Bus (USB) 3.0 is one of the USB interface standards for communication between a computer and an electronic device. USB 3.0 provides improved speeds compared to earlier USB standards. For instance, USB 3.0 supports speeds of up to 5 gigabits per second (Gbps), and is called SuperSpeed USB. Furthermore, USB 3.0 is approximately 10 times faster than USB 2.0 that offers a speed of 480 megabits per second (Mbps).

Moreover, a U3 mode defined in the USB 3.0 protocol refers to a state where a USB 3.0 device enters a suspend state that minimizes power consumption. However, even in the suspend state, when a USB block is in an on state, the USB block still consumes power. Thus, when a main controller and a communication interface of an electronic device are connected to each other via a USB interface, a problem occurs in that a criterion of power consumption in a suspend state required by the electronic device may not be satisfied.

Another problem is that, when the electronic device enters a normal mode from the suspend mode, it takes a long time to reset the communication interface to reconnect a main controller to the communication interface.

SUMMARY

According to various embodiments of the disclosure, provided are an electronic device and an operation method of the electronic device, which are capable of minimizing power consumption in a suspend state and quickly connecting a main controller to a communication interface during an instant-on operation.

In accordance with an aspect of the disclosure, there is provide an electronic device including: a memory storing one or more instructions; a first processor configured to execute the one or more instructions stored in the memory; a second processor; and a communication interface, wherein the first processor and the communication interface are connected via a universal serial bus (USB) interface, and the second processor and the communication interface are connected via a hardware (HW) wire, wherein the second processor is configured to: transmit, via the HW wire, state information indicating a state of the first processor to the communication interface; and based on the first processor entering a suspend mode from a normal mode, change the state information from a first value to a second value, wherein the communication interface is configured to, based on the state information being changed from the first value to the second value, disconnect the first processor from the communication interface by turning off power of the USB interface, wherein the second processor is further configured to, based on the first processor entering the normal mode from the suspend mode, change the state information from the second value to the first value, and wherein the communication interface is further configured to, based on the state information being changed from the second value to the first value, connect the first processor to the communication interface by turning on the power of the USB interface.

The communication interface may be further configured to, based on the state information being changed from the first value to the second value, disable a transmission/reception port included in the USB interface.

The communication interface may be further configured to, based on the state information being changed from the second value to the first value, enable a transmission/reception port included in the USB interface.

Based on cold booting being performed, the second processor may be further configured to transmit a reset signal to the communication interface, and wherein the first processor may be further configured to execute the one or more instructions to connect the first processor to the communication interface via the USB interface by performing operations according to a first sequence.

Based on entering the normal mode from the suspend mode, the first processor may be further configured to execute the one or more instructions to connect the first processor to the communication interface via the USB interface by performing operations according to a second sequence.

The first processor may be further configured to execute the one or more instructions to: set network information including wireless channel information; based on the set wireless channel information corresponding to a first frequency, connect the first processor to the communication interface via the USB interface at a first physical layer (PHY) speed; and based on the set wireless channel information corresponding to a second frequency, connect the first processor to the communication interface via the USB interface at a second PHY speed.

The electronic device may further include a detector configured to receive a user input for setting the network information, wherein the first processor is further configured to execute the one or more instructions to set the network information based on the user input for setting the network information.

The first frequency may be 5 Gigahertz (GHz), the second frequency may be 2.4 GHz, the first PHY speed may 5 Gigabits per second (Gbps), and the second PHY speed may be 2.5 Gbps.

The first processor may be further configured to execute the one or more instructions to: identify information about a wireless channel currently connected to the communication interface; based on the information about the wireless channel corresponding to a first frequency, connect the first processor to the communication interface via a first type of transmission/reception port included in the USB interface; and based on the information about the wireless channel corresponding to a second frequency, connect the first processor to the communication interface via a second type of transmission/reception port included in the USB interface.

The first type of transmission/reception port may be a transmission/reception port corresponding to a USB 2.0 standard, and the second type of transmission/reception port is a transmission/reception port corresponding to a USB 3.0 standard.

In accordance with another aspect of the disclosure, there is provide an operation method of an electronic device, the operation method included: transmitting, by a second processor of the electronic device, state information indicating a state of a first processor of the electronic device to a communication interface of the electronic device via a hardware (HW) wire; based on the first processor entering a suspend mode from a normal mode, changing the state information from a first value to a second value; based on the state information being changed from the first value to the second value, disconnecting the first processor from the communication interface by turning off power of a universal serial bus (USB) interface; based on the first processor entering the normal mode from the suspend mode, changing the state information from the second value to the first value; and based on the state information being changed from the second value to the first value, connecting the first processor to the communication interface by turning on the power of the USB interface.

The disconnecting the first processor from the communication interface may include, based on the state information being changed from the first value to the second value, disabling a transmission/reception port included in the USB interface.

The connecting the first processor to the communication interface may include, based on the state information being changed from the second value to the first value, enabling a transmission/reception included in the USB interface.

The operation method may further include based on cold booting being performed, transmitting, by the second processor, a reset signal to the communication interface; and connecting, by the first processor, the first processor to the communication interface via the USB interface by performing operations according to a first sequence.

The connecting the first processor to the communication interface may include, based on the first processor entering the normal mode from the suspend mode, connecting the first processor to the communication interface via the USB interface by performing operations according to a second sequence.

The operation method may further include setting network information including wireless channel information; based on the set wireless channel information corresponding to a first frequency, connecting the first processor to the communication interface via the USB interface at a first physical layer (PHY) speed; and based on the set wireless channel information corresponding to a second frequency, connecting the first processor to the communication interface via the USB interface at a second PHY speed.

The operation method may further include receiving a user input for setting the network information, wherein the setting of the network information includes setting the network information based on the user input for setting the network information.

The first frequency may be 5 Gigahertz (GHz), the second frequency may be 2.4 GHz, the first PHY speed may be 5 Gigabits per second (Gbps), and the second PHY speed may be 2.5 Gbps.

The operation method may further include identifying information about a wireless channel currently connected to the communication interface; based on the information about the wireless channel corresponding to a first frequency, connecting the first processor to the communication interface via a first type of transmission/reception port included in the USB interface; and based on the information about the wireless channel corresponds to a second frequency, connecting the first processor to the communication interface via a second type of transmission/reception port included in the USB interface.

The first type of transmission/reception port may be a transmission/reception port corresponding to a USB 2.0 standard, and the second type of transmission/reception port may be a transmission/reception port corresponding to a USB 3.0 standard.

In accordance with another aspect of the disclosure, there is provide a non-transitory computer-readable recording medium having stored therein a program for performing an operation method of an electronic device, the operation method including: transmitting, by a second processor of the electronic device, state information indicating a state of a first processor of the electronic device to a communication interface of the electronic device via a hardware (HW) wire; based on the first processor entering a suspend mode from a normal mode, changing the state information from a first value to a second value; based on the state information being changed from the first value to the second value, disconnecting the first processor from the communication interface by turning off power of a universal serial bus (USB) interface; based on the first processor entering the normal mode from the suspend mode, changing the state information from the second value to the first value; and based on the state information being changed from the second value to the first value, connecting the first processor to the communication interface by turning on the power of the USB interface.

According to an aspect of the disclosure, when entering a suspend mode from a normal mode, an electronic device may minimize power consumption by turning off power of a Universal Serial Bus (USB) interface for connecting a main controller and a communicator of the electronic device.

According to an aspect of the disclosure, when entering the normal mode from the suspend mode, the electronic device may perform fast booting (instant-on) by minimizing the number of operations required to connect the main controller to the communicator.

According to an aspect of the disclosure, the electronic device may prevent occurrence of noise by adjusting a speed at which the main controller is connected to the communicator according to network setting information.

According to an aspect of the disclosure, the electronic device may prevent occurrence of noise by operating the USB interface according to the USB 2.0 standard or USB 3.0 standard based on information about a network currently connected to the electronic device.

BRIEF DESCRIPTION OF THE DRAWINGS

FIG. 4 is a flowchart of an operation method of an electronic device when the electronic device enters a suspend mode or a normal mode, according to an embodiment of the disclosure.

DETAILED DESCRIPTION

Figure 1:
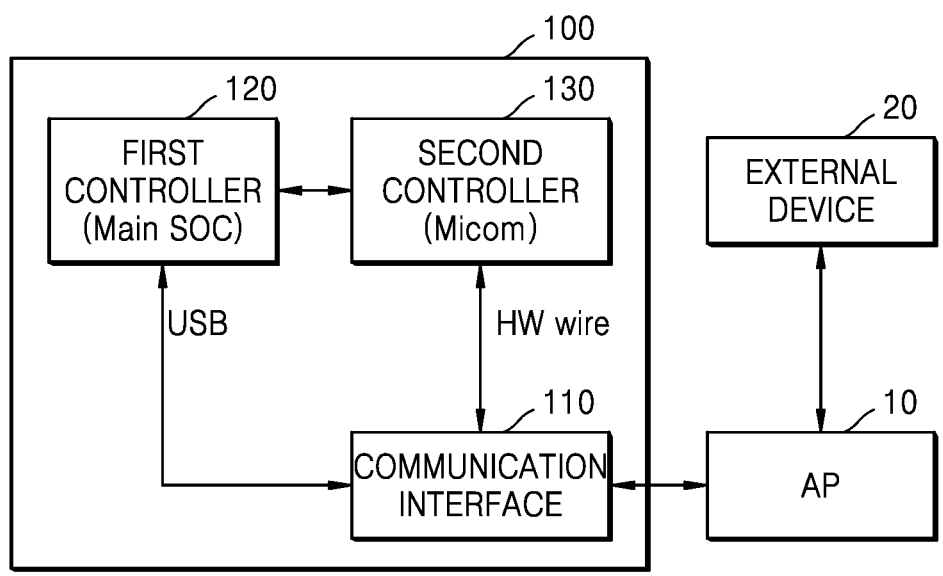
FIG. 1 illustrates an electronic device according to an embodiment of the disclosure.

Throughout the disclosure, the expression "at least one of a, b or c" indicates only a, only b, only c, both a and b, both a and c, both b and c, or all of a, b, and c.

Terms used in the present specification will now be briefly described and then the disclosure will be described in detail.

The terms used in the disclosure are general terms currently widely used in the art based on functions described in the disclosure, but may have different meanings according to an intention of one of ordinary skill in the art, precedent cases, advent of new technologies, etc. Furthermore, some particular terms may be arbitrarily selected by the applicant, and in this case, the meaning of the selected terms will be described in detail in the detailed description of the disclosure. Thus, the terms used herein should be defined not by simple appellations thereof but based on the meaning of the terms together with the overall description of the disclosure.

Throughout the specification, when a part "includes" or "comprises" an element, unless there is a particular description contrary thereto, it is understood that the part may further include other elements, not excluding the other elements. Furthermore, terms such as "portion," "module," etc. used herein indicate a unit for processing at least one function or operation and may be embodied as hardware or software or a combination of hardware and software.

Embodiments of the disclosure will now be described more fully hereinafter with reference to the accompanying drawings so that they may be easily implemented by one of ordinary skill in the art. However, the disclosure may be implemented in different forms and should not be construed as being limited to the embodiments set forth herein. In addition, parts not related to descriptions of the disclosure are omitted to clearly explain embodiments of the disclosure in the drawings, and like reference numerals denote like elements throughout.

FIG. 1 illustrates an electronic device according to an embodiment of the disclosure.

According to an embodiment of the disclosure, the electronic device 100 may be implemented as various forms of devices such as a TV, a mobile phone, a digital camera, a camcorder, a notebook computer (a laptop computer), a desktop PC, an electronic-book terminal, a digital broadcasting terminal, a personal digital assistant (PDA), a portable multimedia player (PMP), a navigation device, an MP3 player, a wearable device, etc. Furthermore, the electronic device 100 may be a stationary electronic device at a fixed position or movable electronic device that is portable, or may be a digital broadcasting receiver capable of receiving digital broadcasting.

Referring to FIG. 1, according to an embodiment of the disclosure, the electronic device 100 may include a communication interface 110, a first controller 120, and a second controller 130.

According to an embodiment of the disclosure, the first controller 120 may be processor such as a main central processing unit (CPU), and may be configured in the form of a system-on-chip (SoC), but is not limited thereto. According to an embodiment of the disclosure, the first controller 120 may be a main processor. The first controller 120 may control all operations of the electronic device 100. In detail, the first controller 120 may control operations of the electronic device 100 after the electronic device 100 wakes up.

According to an embodiment of the disclosure, the communication interface 110 may transmit data or signals to an external device 20 or an external server or receive data or signals from the external device 20 or the external server according to control by the first controller 120. According to an embodiment of the disclosure, the communication interface 110 may be connected to an access point (AP) 10. When the communication interface 110 is connected to the AP 10, the electronic device 100 may be interconnected via a wireless communication network with the external device 20 connected to the AP 10. For example, the AP 10 may enable the electronic device 100 and the external device 20 to connect to the same wireless local area network (LAN) and communicate with each other.

According to an embodiment of the disclosure, the external device 20 may include, but is not limited to, mobile computing devices such as a wearable device, a smartphone, a tablet PC, a PDA, a laptop computer, a media player, a micro server, a global positioning system (GPS), etc.

According to an embodiment of the disclosure, the electronic device 100 may operate according to control by the external device 20. For example, when a user is far from the electronic device 100, the user may transmit a signal for requesting power-on to the electronic device 100 by using the external device 20 carried by the user. In this case, the signal for requesting power-on may be transmitted to the communication interface 110 of the electronic device 100 via the AP 10.

According to an embodiment of the disclosure, the communication interface 110 may transmit or receive data or signals by using at least one of a wireless LAN (e.g., Wi-Fi), Bluetooth, wired Ethernet, Infrared (IR), Bluetooth Low Energy (BLE), ultrasound, Zigbee, or High-Definition Multimedia Interface (HDMI). In this case, the communication interface 110 may include at least one communication module capable of transmitting or receiving data according to communication standards corresponding to the above-described wireless LAN (e.g., Wi-Fi), Bluetooth, wired Ethernet, IR, BLE, ultrasound, Zigbee, and HDMI.

In addition, a wireless LAN communication module may include a Wi-Fi communication module for performing wireless communication according to a Wi-Fi communication standard. The Wi-Fi communication module may include a Wi-Fi chipset that is a Wi-Fi module capable of transmitting data packets according to a Wi-Fi communication standard.

For example, the communication interface 110 may include a communication module corresponding to a wired/wireless network responsible for a connection at a medium access control (MAC) layer (layer 2) and a layer below it, such as a Wi-Fi chipset that is a Wi-Fi module and/or an Ethernet module (wired), and may operate independently of the first controller 120.

According to an embodiment of the disclosure, the communication interface 110 may be connected to the first controller 120 via a USB interface. In this case, the first controller 120 acts as a USB host, and the communication interface 110 acts as a USB device. In this case, the USB interface for connecting the first controller 120 to the communication interface 110 may be a USB 3.0 interface, but is not limited thereto.

Moreover, a USB 3.0 interface may include a USB 2.0 interface. For example, a USB 3.0 port includes 9 pins, and the 9 pins include 4 pins (i.e., 2 power pins and 2 data communication pins) included in a USB 2.0 port, 4 pins for high-speed data transmission, and 1 ground pin.

According to an embodiment of the disclosure, the second controller 130 may be processor such as a microcomputer (Micom). According to an embodiment of the disclosure, the second controller 130 may be a sub-processor. In order to wake up the first controller 120, the second controller 130 may check a wake-up pulse generated by the communication interface 110 to resume the first controller 120. The resume operation is an operation in which the first controller 120 switches from a suspend mode to a normal mode, and may also be referred to as instant-on.

Furthermore, even when the electronic device 100 or the first controller 120 is in the suspend mode, the second controller 130 may receive power and maintain an ON state. In addition, the second controller 130 may be included in the communication interface 110. In this case, when the electronic device 100 enters the suspend mode and power is supplied to the communication interface 110, operating power may also be supplied to the second controller 130 included in the communication interface 110.

According to an embodiment of the disclosure, the second controller 130 may be connected to the communication interface 110 via a hardware (HW) wire. For example, the HW wire may be composed of a general-purpose input/output (GPIO) pin, an inter-integrated circuit (I2C) pin, a reset pin, etc., but is not limited thereto. A GPIO refers to a digital signal pin on an integrated circuit or electrical circuit board of which the behavior including an input or output may be controlled by the user at runtime. I2C may refer to a communication method used between components on the same circuit board, and may be used between components connected via a cable as well as on a single circuit board. A reset operation may refer to an operation of returning a part of a device or the entire system to a predetermined state.

The second controller 130 and the communication interface 110 may share state information through the HW wire. For example, the state information may be a value representing a state of the first controller 120. The second controller 130 may transmit, via the HW wire, the state information indicating the state of the first controller 120 to the communication interface 110. The state information may include a first value and a second value. When the state information is a first value, this indicates that the first controller 120 is in an Off state or in the suspend mode, and when the state information is a second value, this indicates that the first controller 120 is in the normal mode. Alternatively, according to an embodiment of the disclosure, when the state information is a first value, this indicates that the first controller 120 is in the normal mode, and when the state information is a second value, this may indicate that the first controller 120 is in the suspend mode.

According to an embodiment of the disclosure, operating modes of the electronic device 100 may mainly include a normal mode and a suspend mode. In detail, the normal mode may be distinguished from the suspend mode according to whether power is supplied to at least one component other than the communication interface 110. In detail, the normal mode may refer to an operating state in which power is supplied to the communication interface 110 and at least one component of the electronic device 100. In addition, the suspend mode may refer to an operating state in which power is supplied only to the communication interface 110.

For example, when the electronic device 100 is a display device and is powered off, the display device may enter a suspend mode. Here, power-off may refer to an operation of turning off the electronic device 100 that had been playing back image data by using a remote controller or the like. When the electronic device 100 is powered off, a display screen of the electronic device 100 is switched to a black screen, so that the electronic device 100 enters a suspend mode.

According to an embodiment of the disclosure, when the first controller 120 enters the suspend mode from the normal mode, the second controller 130 may change state information from a second value to a first value and transmit the changed state information to the communication interface 110 via the HW wire.

On the other hand, when the electronic device 100 that is in the suspend mode is powered back on, the electronic device 100 may enter the normal mode. In this case, power-on may refer to an operation of switching the electronic device 100 from a display in a black screen state to a state in which image data is to be played back.

When the first controller 120 enters the normal mode from the suspend mode, according to an embodiment of the disclosure, the second controller 130 may change state information from a first value to a second value, and transmit the changed state information to the communication interface 110 via the HW wire.

Figure 2:
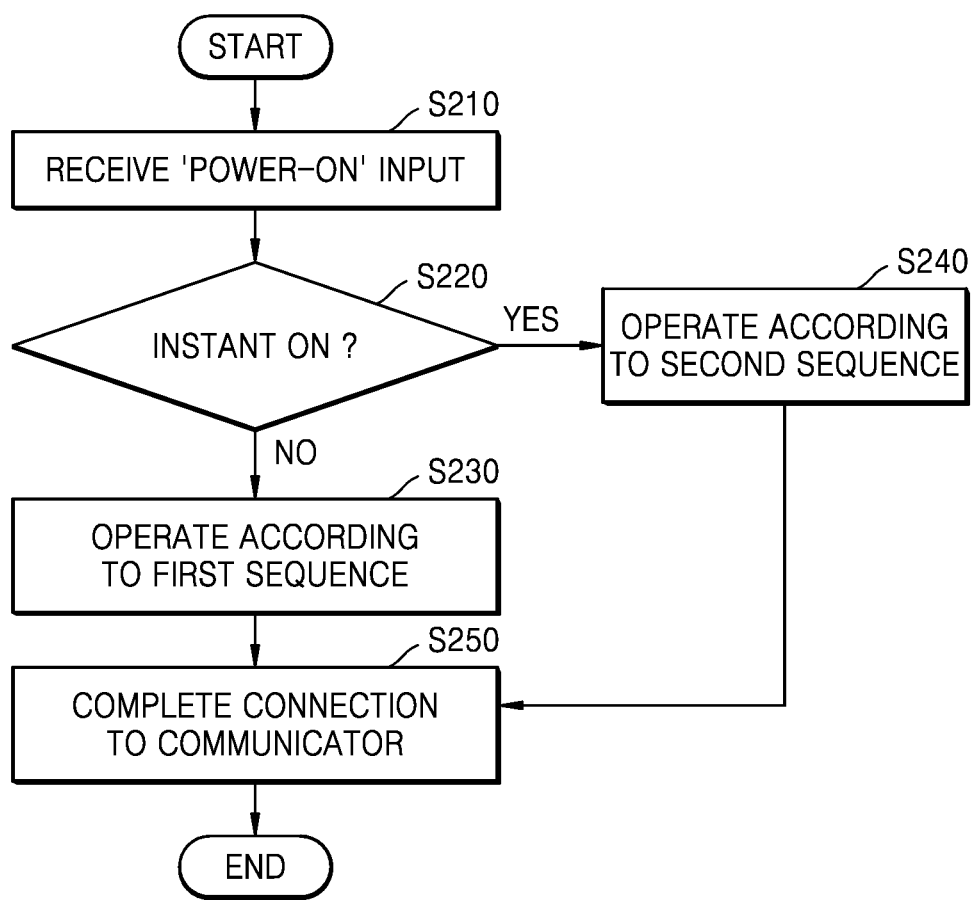
FIGS. 2 and 3 are flowcharts for describing booting operations performed by an electronic device, according to embodiments of the disclosure.
Figure 3:
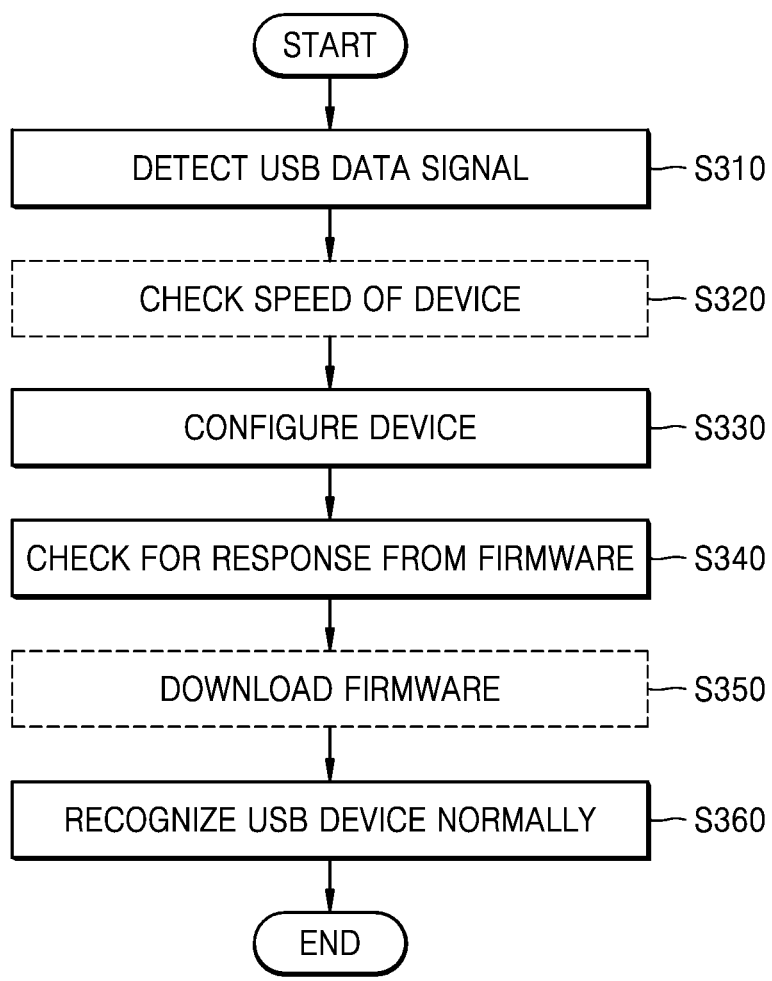

FIGS. 2 and 3 are flowcharts for describing booting operations performed by an electronic device, according to embodiments of the disclosure.

Referring to FIG. 2, according to an embodiment of the disclosure, upon receiving a power-on input (operation S210), the electronic device 100 may start booting. For example, when the electronic device 100 is a display device including a display, power-on may refer to an operation of turning on the electronic device 100 with the display in a black screen state by using a remote controller or the like. When the electronic device 100 is powered on, a display screen of the electronic device 100 is switched from a black screen to a state in which image data is to played back.

On the other hand, power-off may refer to an operation of turning off the electronic device 100 that had been playing back image data. When the electronic device 100 is powered off, the display screen of the electronic device 100 is switched to a black screen. 'Power on' and 'power off' may also be referred to as 'turn on' and 'turn off', respectively.

According to an embodiment of the disclosure, booting of the electronic device 100 may include cold booting, AC-on, and instant-on.

Cold booting and AC-on refer to booting in which a system of the electronic device 100 is started from its initial state. In particular, the AC-on may refer to booting performed when power supply from an external power source is interrupted and then resumed (e.g., when a power plug of an image display device is disconnected from an external power source and then connected thereto).

Instant-on refers to an operation of resuming the electronic device 100 from a suspend mode. According to an embodiment, an operation is performed to determine whether or not an instant-on operation is performed (operation S220).

When the booting performed by the electronic device 100 is cold booting or AC-on, the electronic device 100 may connect the first controller 120 to the communication interface 110 by operating according to a first sequence (operations S230 and S250).

On the other hand, when the booting performed by the electronic device 100 is instant-on, the electronic device 100 may connect the first controller 120 to the communication interface 110 by operating according to a second sequence (operations S240 and S250).

Operations according to the first and second sequences will now be described in detail with reference to FIG. 3.

Referring to FIG. 3, according to an embodiment of the disclosure, a first sequence of operations may include detecting a USB data signal (operation S310), checking a speed of a USB device (operation S320), configuring the USB device (operation S330), checking for a response from firmware (operation S340), downloading the firmware (operation S350), and recognizing the USB device normally (operation S360).

According to the first sequence of operations, the first controller 120 that is a USB host may detect a USB data signal. The USB data signal may mean a data signal received from a USB device via a USB interface. In addition, the first controller 120 may check a speed of the USB device. In this case, the USB device means a communication interface 110 according to an embodiment of the disclosure. The speed of the USB device may include super speed, high speed, full speed, and low speed. For example, USB 1.0 may provide low speed (e.g., 1.5 Megabits per second (Mbps)) and full speed (e.g., 12 Mbps), USB 2.0 may provide high speed (e.g., 480 Mbps), and USB 3.0 may provide super speed (5 Gigabits per second (Gbps)).

Furthermore, the first controller 120 may collect USB device configuration information. The USB device configuration information may mean MAC address information, information about the USB device, etc. The first controller 120 may configure the USB device.

The first controller 120 may check for a response from firmware, and when there is no response from the firmware, download the firmware.

When the firmware is downloaded, the USB device is normally recognized, and the connection between the first controller 120 and the communication interface 110 is completed.

On the other hand, according to an embodiment of the disclosure, a second sequence of operations may not include operations S320 and S350 from among operations S310 through S360 included in the first sequence of operations described with reference to FIG. 3. For example, when booting is performed via instant-on, information about a previously recognized USB device is already stored in the first controller 120. Thus, operation S320 of checking the speed of the USB device is not required. Moreover, when booting is performed via instant-on, even when the USB device is configured, only some pieces of information may be collected for this purpose. In addition, because previous downloaded firmware may be used in the operation of checking for the response from the firmware, the operation S350 of downloading the firmware may be omitted when booting is performed via instant-on.

Thus, when connecting the first controller 120 to the communication interface 110 according to the second sequence of operations, the time required to recognize the USB device and connect them may be shortened compared to the case of connecting the first controller 120 to the communication interface 110 according to the first sequence of operations. Accordingly, fast booting is enabled.

According to an embodiment of the disclosure, when booting via instant-on, the electronic device 100 may connect the first controller 120 to the communication interface 110 at a higher speed by operating according to the second sequence instead of the first sequence (operations when cold booting or booting via AC-on).

The operations included in the first sequence shown in FIG. 3 are provided for illustration of an embodiment of the disclosure, and may be integrated, added, or omitted according to the specification of the electronic device 100 that is actually implemented. In other words, when necessary, a single operation may be split into two or more operations, and other operations may added between the operations or some operations may be omitted. Functions performed in each operation are intended to describe an embodiment of the disclosure, and a specific operation related to the functions does not limit the scope of the disclosure.

FIG. 4 is a flowchart of an operation method when the electronic device 100 enters a suspend mode or a normal mode, according to an embodiment of the disclosure.

Referring to FIG. 4, according to an embodiment of the disclosure, the electronic device 100 may transmit state information to the communication interface 110 via an HW wire (operation S410). According to an embodiment of the disclosure, the state information may include a value representing a state of the first controller 120. The state information may include a first value and a second value. According to an embodiment, when the first controller 120 is in the normal mode, the second controller 130 may transmit the first value to the communication interface 110, and when the first controller 120 is in the suspend mode, the second controller 130 may transmit the second value to the communication interface 110. In this case, the first value may be '0', and the second value may be '1'. However, embodiments of the disclosure are not limited thereto.

According to an embodiment, the operation may include checking whether the electronic device 100 enters the suspend mode (operation S420).

When the electronic device 100 enters the suspend mode from the normal mode, the electronic device 100 may change the value of the state information from the first value to the second value (operation S430).

When the value of the state information received via the HW wire is changed from the first value to the second value, the communication interface 110 may disconnect itself from the first controller 120 by turning off power of a USB interface (operation S440).

For example, the communication interface 110 may disable a transmission (TX)/reception (RX) port included in the USB interface. The TX/RX port included in the USB interface may include at least one of an RX– port, an RX+ port, a TX– port, a TX+ port, a D– port, or a D+ port. When the TX/RX port is disabled, a signal value for the TX/RX port may be '0'. In this way, the electronic device 100 may minimize power consumed in the suspend mode by turning off the power of the USB interface.

Referring again to FIG. 4, the operation may include checking whether the electronic device 100 enters the normal mode (operation S450). when entering the normal mode from the suspend mode, the electronic device 100 may change the value of the state information from the second value to the first value (operation S460).

When the value of the state information received via the HW wire is changed from the second value to the first value, the communication interface 110 may connect itself to the first controller 120 by turning on the power of the USB interface (operation S470).

For example, the communication interface 110 may enable a TX/RX port included in the USB interface. When the TX/RX port is enabled, the signal value for the TX/RX port may be '1'.

When the TX/RX port is enabled, the first controller 120 may detect a USB data signal (a signal for the TX/RX port in the USB interface), and perform the second sequence of operations described with reference to FIGS. 2 and 3 to connect itself to the communication interface 110. Accordingly, the first controller 120 may minimize an operating time required to normally recognize and connect to the communication interface 110, thereby enabling fast booting.

As the time required to recognize and connect to the communication interface 110 is shortened, the time required to enable a communication function of the communication interface 110 may also be shortened. Accordingly, functions connected via the communication interface 110 (functions provided by an external device or external server connected via Wi-Fi or Bluetooth (e.g., an audio playback function of a sound bar connected via Bluetooth)) may be provided quickly.

FIGS. 5A through 5D are graphs illustrating data signals for the communication interface with respect to states of the electronic device, according to embodiments of the disclosure.

Figure 5A:
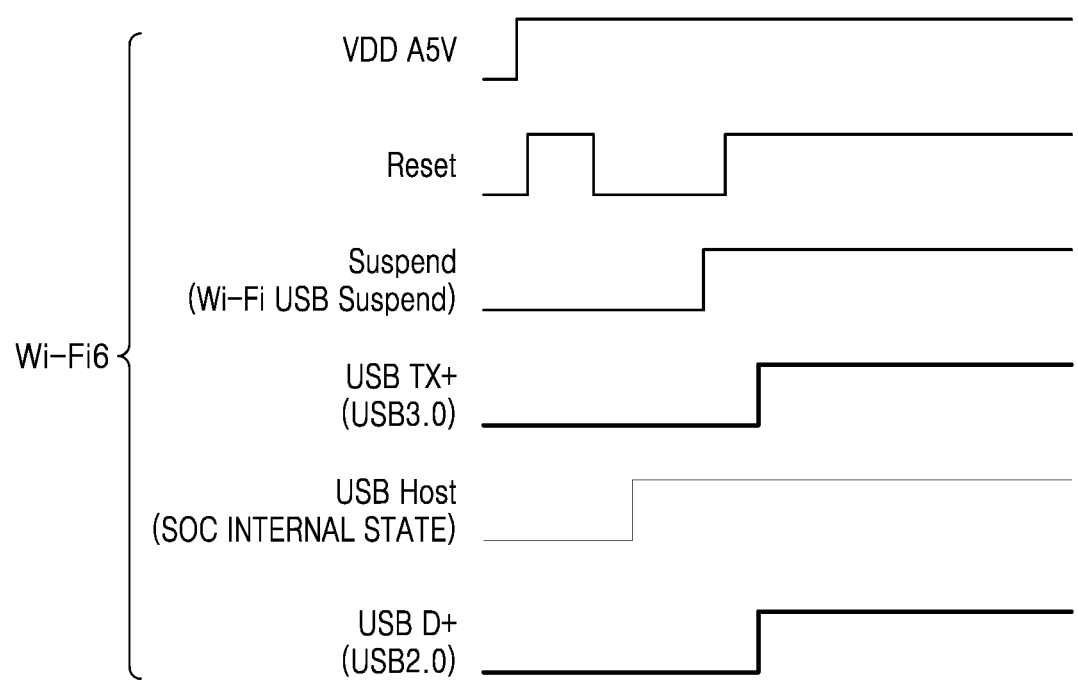
FIGS. 5A through 5D are graphs illustrating data signals for a communicator with respect to states of an electronic device, according to embodiments of the disclosure.

FIG. 5A is a graph illustrating a data signal for the communication interface 110 when the electronic device 100 is cold booted or booted via AC-on.

Referring to FIG. 5A, when the electronic device 100 is cold booted or booted via AC-on, power (VDD A5V) starts to be applied to the second controller 130, and accordingly, power (VDD A5V) also starts to be applied to the communication interface 110. Furthermore, as the electronic device 100 is cold booted, a value of a signal indicating a state of the first controller (USB host) 120 is changed from '0' to '1', and a reset signal is applied to the communication interface 110.

In addition, as the first controller 120 is booted, a value of a signal (suspend signal) from the HW wire connected to the second controller 130 is changed from '0' to '1'.

As the communication interface 110 is reset, TX/RX ports (e.g., USB TX+, USB TX−, USB RX+, USB RX−, USB D+, and USB D−) included in a USB interface for the communication interface 110 are also enabled, and accordingly, a value of signals for the TX/RX ports is changed from '0' to '1'.

When the communication interface 110 is reset, the first controller 120 is connected to the communication interface 110 through the first sequence of operations described with reference to FIGS. 2 and 3.

Figure 5B:
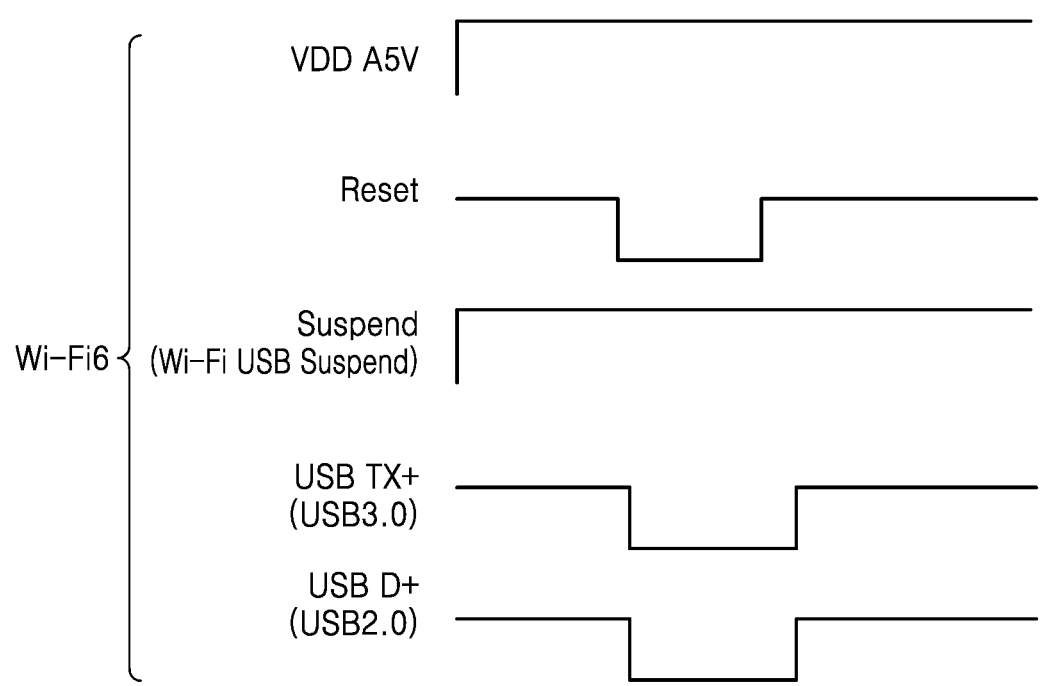

FIG. 5B is a graph illustrating a data signal for the communication interface 110 when the communication interface 110 is reset while the electronic device 100 is operating in a normal mode.

Referring to FIG. 5B, when the electronic device 100 operates in a normal mode, supply of power (VDD A5V) to the communication interface 110 is maintained. In addition, because the electronic device 100 operates in the normal mode, a value of a signal (suspend signal) from the HW wire connected to the second controller 130 remains '1'.

When a reset signal is applied to the communication interface 110, the TX/RX ports included in the USB interface for the communication interface 110 are also reset. For example, when the electronic device 100 operates in the normal mode, the TX/RX ports may maintain an enabled state (a signal value of '1'), but when a reset signal is applied to the communication interface 110, the state of the TX/RX ports changes to a disabled state (a signal value of '0') and back to an enabled state.

When the reset signal is applied to the communication interface 110, the first controller 120 is connected to the communication interface 110 according to the first sequence of operations described with reference to FIGS. 2 and 3.

Figure 5C:
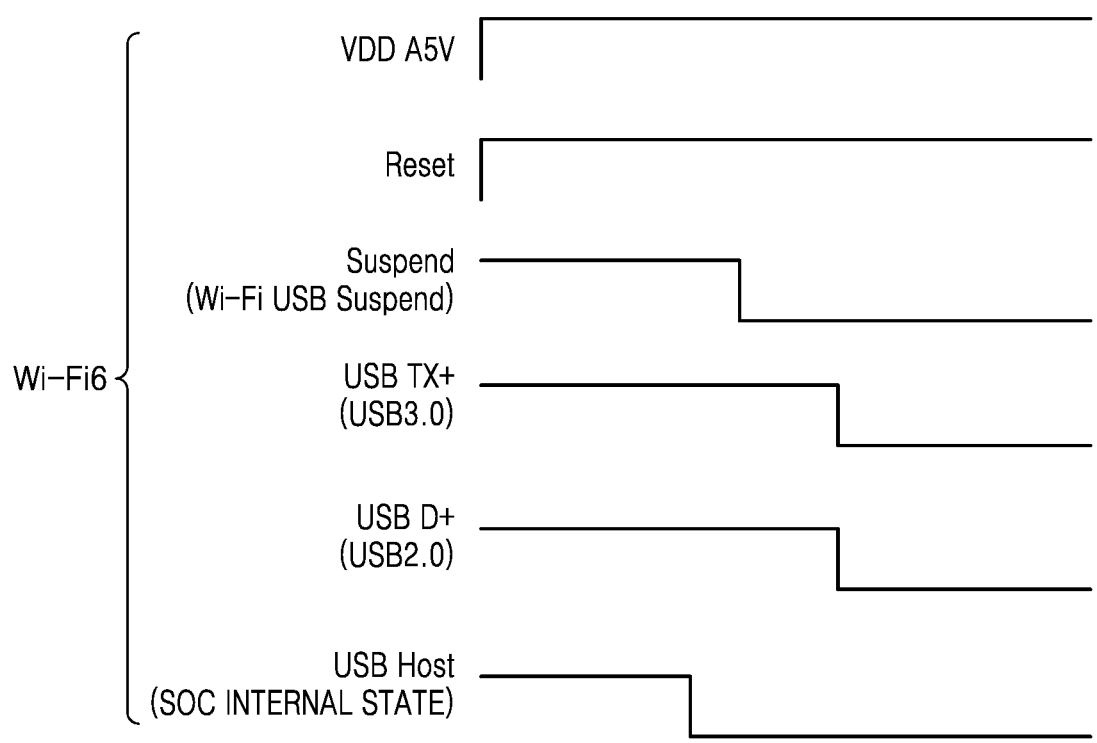

FIG. 5C is a graph illustrating a data signal for the communication interface 110 when the electronic device 100 enters a suspend mode from the normal mode.

Referring to FIG. 5C, even when the electronic device 100 enters the suspend mode while operating in the normal mode, the supply of power (VDD A5V) to the communication interface 110 is maintained. Furthermore, because the reset of the communication interface 110 does not occur, a value of a reset signal applied to the communication interface 110 may also be maintained at a constant value without being changed.

When the first controller 120 enters the suspend mode, a value of a signal indicating a state of the first controller (USB host) 120 is changed from '1' to '0'. Accordingly, a value of a signal (suspend signal) from the HW wire connected to the second controller 130 is also changed from '1' to '0'.

When the suspend signal applied to the communication interface 110 is changed from '1' to '0', the communication interface 110 may disable the TX/RX ports included in the USB interface for the communication interface 110. For example, the communication interface 110 may change a value of signals for the TX/RX ports from '1' to '0'.

Figure 5D:
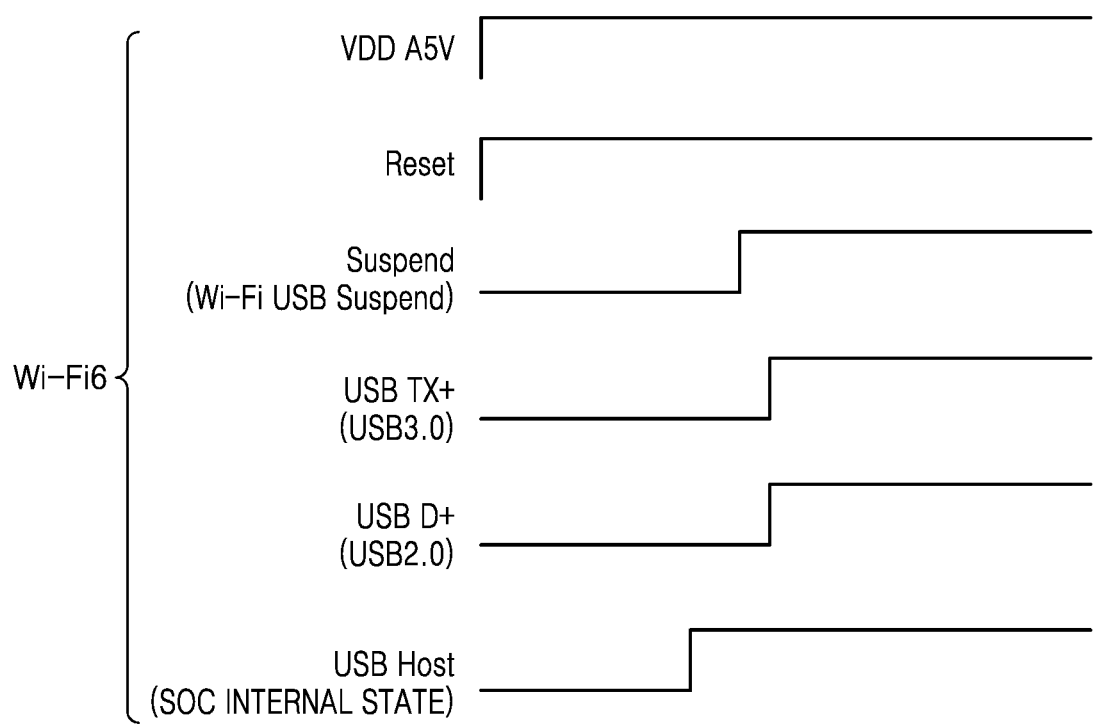

FIG. 5D is a graph illustrating a data signal for the communication interface 110 when the electronic device 100 is resumed.

Referring to FIG. 5D, when the electronic device 100 wakes up and resumes the first controller 120 from the suspend mode, a value of a signal indicating the state of the first controller 120 (USB host) is changed from '0' to '1'.

A value of a signal (suspend signal) for the HW wire connected to the second controller 130 is changed from '0' to '1'. When a value of the suspend signal applied to the communication interface 110 is changed from '0' to '1', the communication interface 110 may enable TX/RX ports included in the USB interface for the communication interface 110. For example, a value of signals for the TX/RX ports may be changed from '0' to '1'.

On the other hand, even when the first controller 120 wakes up, reset of the communication interface 110 does not occur, and the time required to connect the first controller 120 to the communication interface 110 may be shortened when connecting the first controller 120 and the communication interface 110 via reset of the communication interface 110 compared to when connecting them via the suspend signal.

When the electronic device 100 is resumed, a reset signal is not generated, and the first controller 120 and the communication interface 110 are connected via the suspend signal according to the second sequence of operations described with reference to FIGS. 2 and 3. Thus, the time required for enabling a communication function of the communication interface 110 may be shortened.

Figure 6:
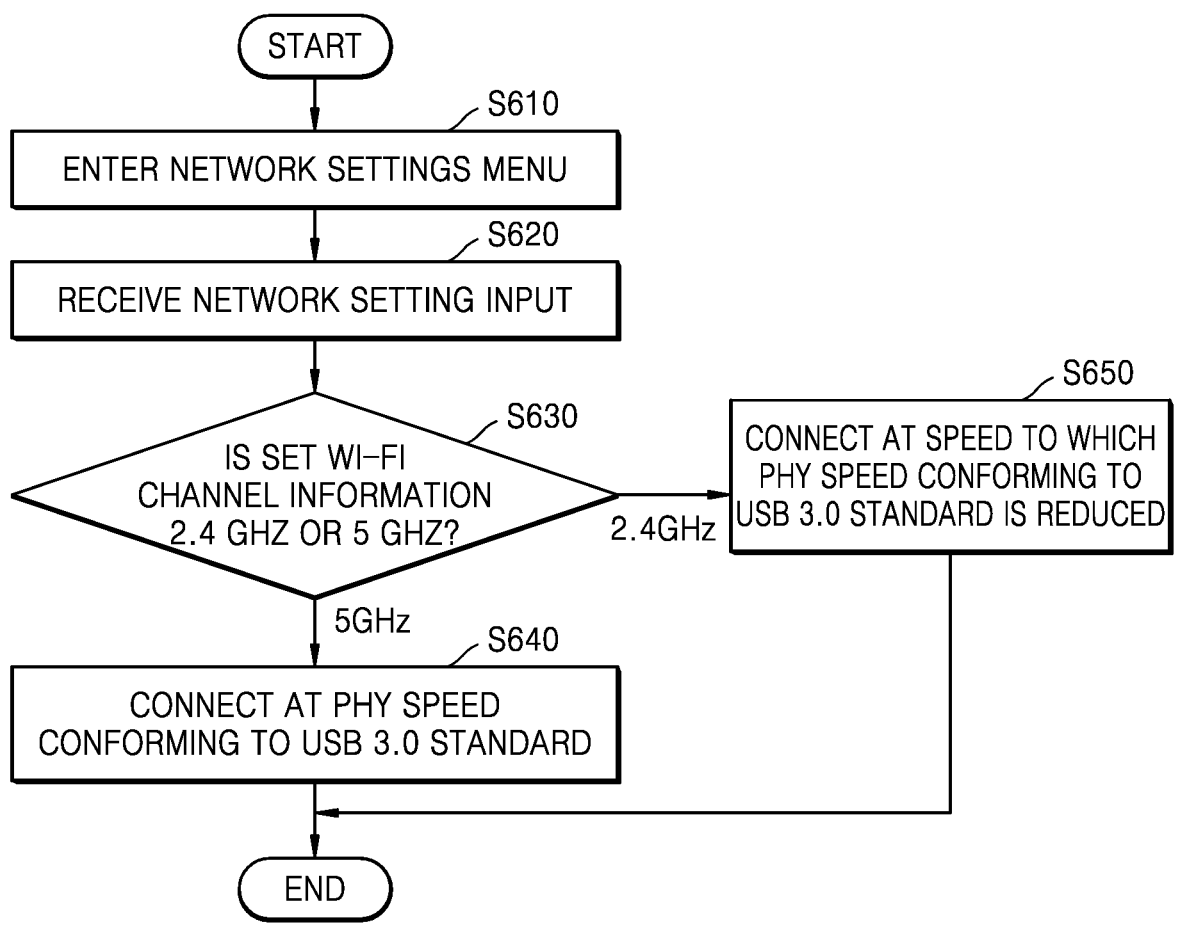
FIG. 6 is a flowchart of a method, performed by an electronic device, of controlling connection between a first controller and a communicator according to network settings, according to an embodiment of the disclosure.
Figure 7:
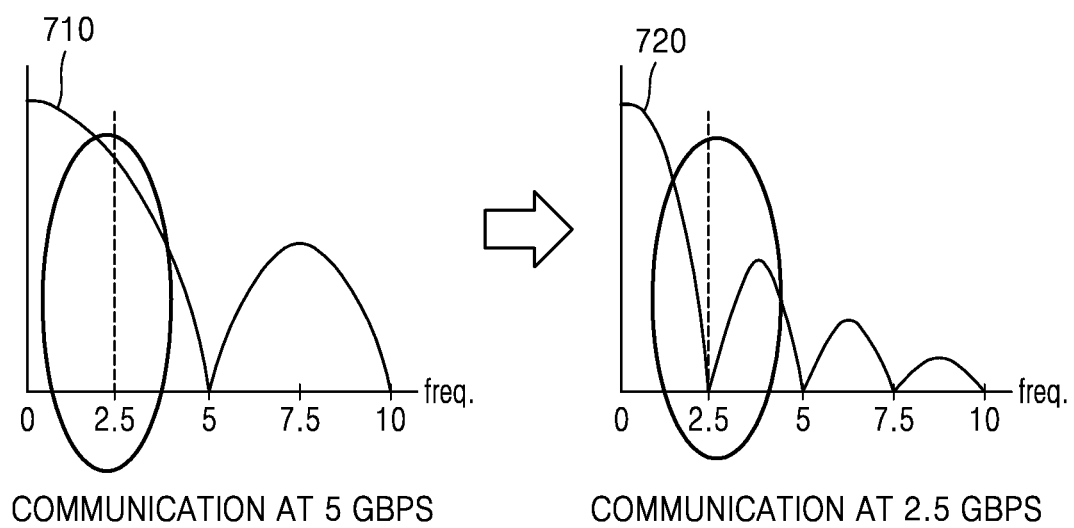
FIG. 7 illustrates reference graphs for describing the method of FIG. 6.

FIG. 6 is a flowchart of a method, performed by the electronic device, of controlling connection between a first controller and a communication interface according to network settings, according to an embodiment of the disclosure, and FIG. 7 illustrates reference graphs for describing the method of FIG. 6.

Referring to FIG. 6, the electronic device 100 may enter a network settings menu (operation S610). For example, the electronic device 100 may enter the network settings menu based on a user input for selecting the network settings menu. In this case, the user may select a network settings menu by using a remote controller, and the electronic device 100 may receive a user input from the remote controller.

Alternatively, during initial setting for a system, the electronic device 100 may automatically enter the network settings menu. However, embodiments of the disclosure are not limited thereto.

According to an embodiment of the disclosure, the electronic device 100 may receive a user input for setting network information (operation S620).

The network information includes wireless channel information, and for example, the wireless channel information may be Wi-Fi channel information. Wi-Fi channels may include, but are not limited to, a 2.4 GHz channel and a 5.0 GHz channel.

The electronic device 100 may receive an input for selecting one of the 2.4 GHz channel and the 5 GHz channel as a Wi-Fi channel, and may set the Wi-Fi channel to the selected channel.

The electronic device 100 may check whether the set Wi-Fi channel is a 2.4 GHz or 5.0 GHz channel (operation S630), and when the set Wi-Fi channel is a 5.0 GHz channel, connect the first controller 120 to the communication interface 110 at a physical layer (PHY) speed (first speed) conforming to the USB 3.0 standard (operation S640). In this case, the first speed may be 5 Gbps (super speed).

On the other hand, when the set Wi-Fi channel is a 2.4 GHz channel, the electronic device 100 may connect the first controller 120 to the communication interface 110 by reducing the PHY speed conforming to the USB 3.0 standard to a second speed (operation S650).

The first controller 120 and the communication interface 110 may each reduce a clock speed of the USB interface by half to thereby reduce the PHY speed from 5 Gbps to 2.5 Gbps, and the first controller 120 may be connected to the communication interface 110 at 2.5 Gbps.

For example, when the first controller 120 and the communication interface 110 communicate with each other at the PHY speed conforming to the USB 3.0 standard, i.e., 5 Gbps, noise occurs according to a communication frequency of the connected Wi-Fi channel, as shown in a first graph 710 of FIG. 7. Referring to the first graph 710, noise does not occur when the communication frequency of the Wi-Fi channel is 5 GHz, but noise occurs when the communication frequency thereof is 2.4 GHz.

On the other hand, when the first controller 120 and the communication interface 110 communicate with each other at a second speed (e.g., 2.5 Gbps) to which the PHY speed is reduced, noise occurs according to the communication frequency of the connected Wi-Fi channel, as shown in a second graph 720. Referring to the second graph 720, noise does not occur either when the communication frequency of the Wi-Fi channel is 5 Hz or when the communication frequency is 2.4 GHz.

Thus, when the Wi-Fi channel is set to a 2.4 GHz channel, in order to prevent occurrence of noise, the first controller 120 may be connected to the communication interface 110 at the second speed (e.g., 2.5 Gbps) to which the PHY speed is reduced.

Figure 8:
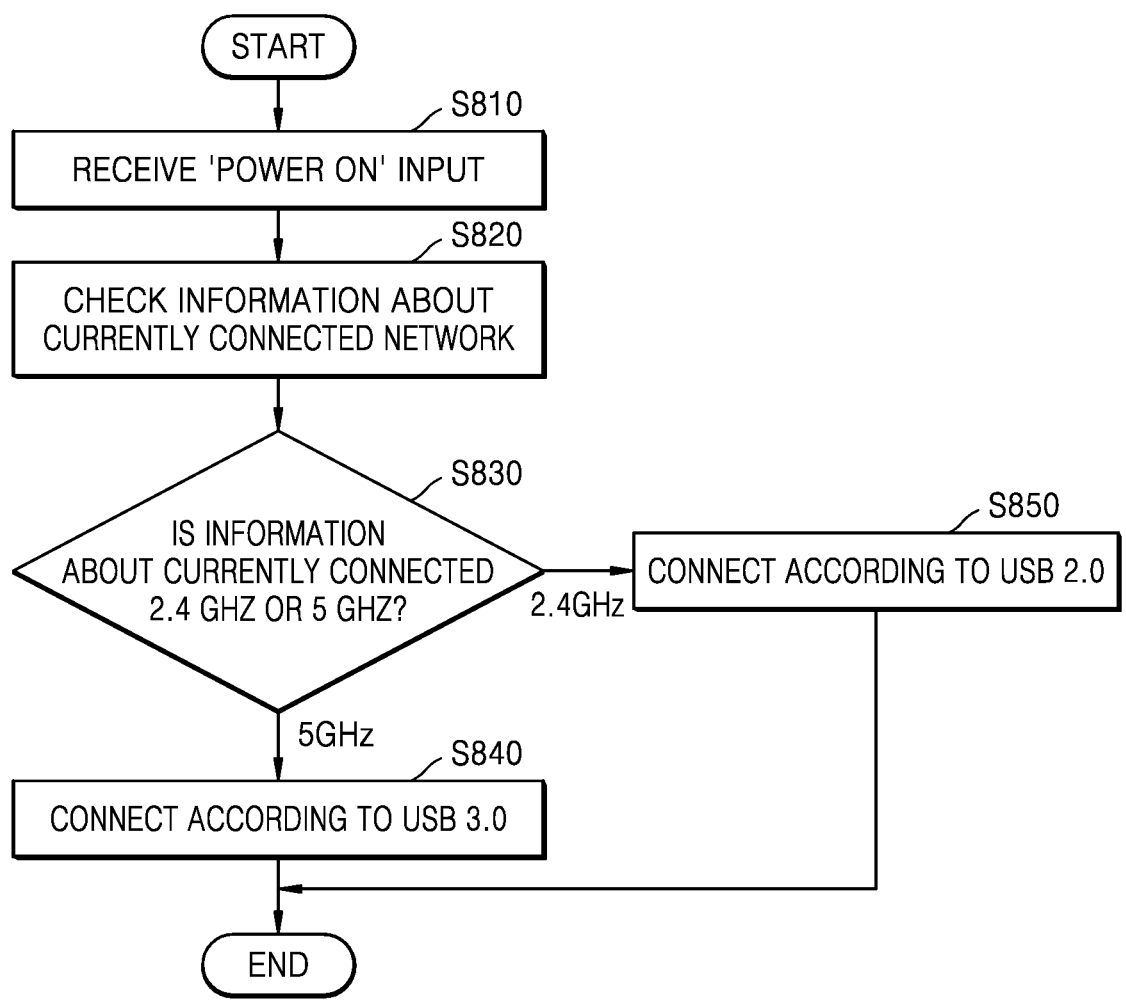
FIG. 8 is a flowchart of a method, performed by an electronic device, of controlling a method of communication between a first controller and a communicator based on network connection information, according to an embodiment of the disclosure.

FIG. 8 is a flowchart of a method, performed by the electronic device 100, of controlling a method of communication between the first controller and the communication interface 110 based on network connection information, according to an embodiment of the disclosure.

Referring to FIG. 8, according to an embodiment of the disclosure, the electronic device 100 may receive a power-on input (operation S810). Upon receiving the power-on input, the electronic device 100 may perform booting. For example, booting via power-on may include at least one of cold booting, AC-on, or instant-on.

When the electronic device 100 is powered on, the electronic device 100 may check information about a currently connected network (operation S820). For example, the electronic device 100 may check information about a wireless channel connected to the communication interface 110. The information about a wireless channel may be information about a Wi-Fi channel. The Wi-Fi channel may include, but is not limited to, a 2.4 GHz channel and a 5.0 GHz channel.

When the electronic device 100 checks the currently connected Wi-Fi channel (operation S830) and determines that information about the currently connected Wi-Fi channel corresponds to 5.0 GHz, the electronic device 100 may connect the first controller 120 to the communication interface 110 at the super speed (5 Gbps) conforming to the USB 3.0 standard (operation S840), and perform communication via the RX− port, RX+ port, TX− port, and TX+ port included in the USB interface.

On the other hand, when the information about the currently connected Wi-Fi channel corresponds to 2.4 GHz, the electronic device 100 may connect the first controller 120 to the communication interface 110 at a high speed (480 Mbps) conforming to the USB 2.0 standard (operation S850), and perform communication via the D−port and D+ port included in the USB interface.

As described with reference to the first graph 710 of FIG. 7, when communication is performed at the super speed (5 Gbps) conforming to the USB 3.0 standard, noise does not occur at a Wi-Fi communication frequency of 5 GHz, while noise occurs at a Wi-Fi communication frequency of 2.4 GHz. Therefore, when the information about the Wi-Fi channel corresponds to 2.4 GHz, occurrence of noise may be prevented by performing communication after connecting at a high speed (480 Mbps) conforming to the USB 2.0 standard.

Figure 9:
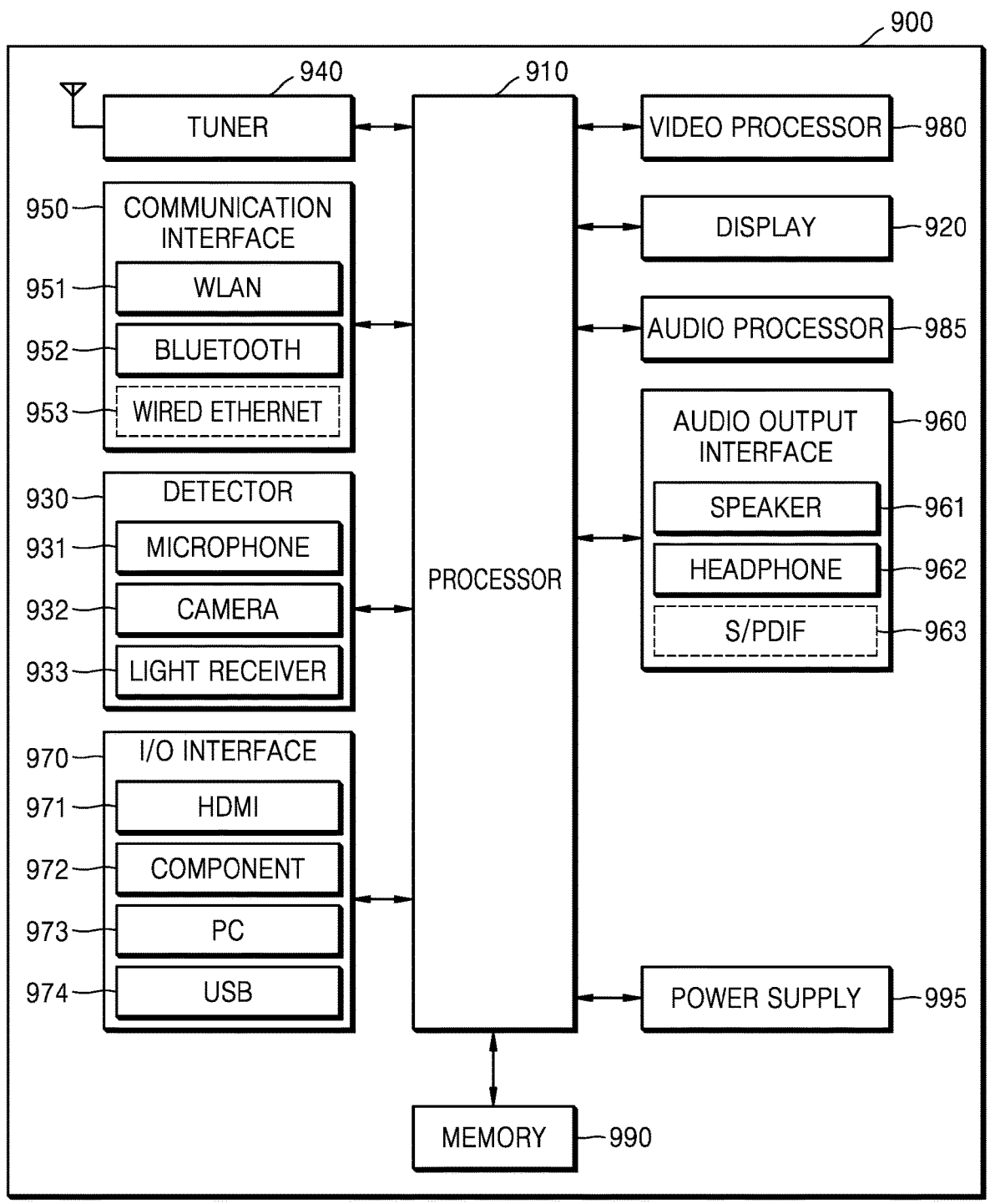
FIG. 9 is a block diagram of a configuration of an electronic device according to another embodiment of the disclosure.

FIG. 9 is a block diagram of a configuration of an electronic device 900 according to another embodiment of the disclosure.

The electronic device 900 of FIG. 9 may be an embodiment of the electronic device 100 described with reference to FIG. 8.

Referring to FIG. 9, the electronic device 900 according to the other embodiment of the disclosure may include a tuner 940, a processor 910, a display 920, a communication interface 950, a detector 930, an I/O interface 970, a video processor 980, an audio processor 985, an audio output interface 960, a memory 990, and a power supply 995.

The communication interface 950 of FIG. 9 is a component corresponding to the communication interface 110 of FIG. 1, and the processor 910 of FIG. 9 is a component including the first and second controllers 120 and 130 of FIG. 1. Descriptions that are already provided above with respect to FIG. 1 will be omitted below.

According to an embodiment of the disclosure, the tuner 940 may tune and then select only a frequency of a channel that is to be received by the electronic device 900 from among many radio wave components by performing amplification, mixing, resonance, etc. of a broadcast signal received in a wired or wireless manner, The broadcast signal may include audio, video, and additional information (e.g., an electronic program guide (EPG)).

The tuner 940 may receive broadcast signals from various sources such as terrestrial broadcasting, cable broadcasting, satellite broadcasting, Internet broadcasting, etc. The tuner 940 may receive broadcast signals from sources such as analog broadcasting, digital broadcasting, etc.

According to an embodiment of the disclosure, the communication interface 950 may transmit data or signals to an external device or server or receive data or signals from the external device or the server according to control by the processor 910. The processor 910 may transmit content to the external device connected via the communication interface 950 or receive content from the external device, download an application from the external device, or perform web browsing through the communication interface 950.

Furthermore, the communication interface 950 may include one of a wireless LAN 951, a Bluetooth module 952, and a wired Ethernet 953, or a module including two or more components among the wireless LAN 951, the Bluetooth module 952, and the wired Ethernet 953.

The video processor 980 may process video data received by the electronic device 900. The video processor 980 may perform various types of image processing, such as decoding, scaling, noise removal, frame rate conversion, and resolution conversion, on the video data.

The detector 930 may detect a user's voice, images, or interactions, and may include a microphone 931, a camera 932, and a light receiver 933.

The microphone 931 may receive a voice uttered by the user. The microphone 931 may convert the received voice into an electrical signal and output the electrical signal to the processor 910. For example, the user's voice may include a voice corresponding to a menu or function of the electronic device 900.

The camera 932 may receive an image (e.g., consecutive frames) corresponding to a user's motion including his or her gesture performed within a recognition range of the camera 932. The processor 910 may select a menu displayed by the electronic device 900 based on the received motion recognition result, or perform control corresponding to the motion recognition result.

The light receiver 933 may receive an optical signal (including a control signal) from an external control device via a light window on a bezel of the display 920. The light receiver 933 may receive, from the control device, an optical signal corresponding to a user input (e.g., touching, pressing, touch gesture, voice, or motion). A control signal may be extracted from the received optical signal according to control by the processor 910.

The I/O interface 970 may receive, according to control by the processor 910, video (e.g., a moving image), audio (e.g., voice, music, etc.), and additional information (e.g., an EPG) from outside of the electronic device 900. The I/O interface 970 may include one of an HDMI port 971, a component jack 972, a PC port 973, and a USB port 974. The I/O interface 970 may include a combination of the HDMI port 971, the component jack 972, the PC port 973, and the USB port 974.

The processor 910 controls all the operations of the electronic device 900 and a flow of signals between the internal components of the electronic device 900 and processes data. When there is an input by the user or preset and stored conditions are satisfied, the processor 910 may execute an operating system (OS) and various applications stored in the memory 990.

The processor 910 may include a processor, RAM that stores signals or data input from outside of the electronic device 900 or is used as a storage area corresponding to various operations performed by the electronic device 900, and ROM that stores a control program for controlling the electronic device 900.

The processor 910 may include a graphics processor. The graphics processor generates a screen including various entities such as an icon, an image, a text, etc. by using an operator and a renderer. The operator calculates attribute values such as coordinate values, in which the entities are to be displayed according to a layout of a screen, shapes, sizes, and colors of the entities by using user inputs detected by the detector 930. The renderer creates a screen having various layouts including the entities based on the attribute values calculated by the operator. The screen created by the renderer is displayed in a region of the display 920.

The display 920 may generate a driving signal by converting an image signal, a data signal, an on-screen display (OSD) signal, a control signal, etc. The display 920 may be implemented as a plasma display panel (PDP), a liquid crystal display (LCD), an organic light-emitting diode (OLED) display, a flexible display, a three-dimensional (3D) display, or the like. Furthermore, the display 920 may be configured as a touch screen for use as an input device as well as an output device.

The audio processor 985 may process audio data. The audio processor 985 may perform various types of processing, such as decoding, amplification, noise removal, etc., on the audio data. Moreover, the audio processor 985 may include a plurality of audio processing modules to process audio corresponding to a plurality of pieces of content.

The audio output interface 960 may output audio in a broadcast signal received via the tuner 940 according to control by the processor 910. The audio output interface 960 may output audio (e.g., a voice, sound, etc.) input via the communication interface 950 or the I/O interface 970. Furthermore, the audio output interface 960 may output audio stored in the memory 990 according to control by the processor 910. The audio output interface 960 may include at least one of a speaker 961, a headphone output terminal 962, or a Sony/Phillips Digital Interface (S/PDIF) output terminal 963. The audio output interface 960 may include a combination of two or more of the speaker 961, the headphone output terminal 962, and the S/PDIF output terminal 963.

The power supply 995 may supply, according to control by the processor 910, power input from an external power source to the internal components of the electronic device 900. The power supply 995 may also supply, according to control by the processor 910, power output from one or more batteries in the electronic device 900 to the internal components.

The memory 990 may store various pieces of data, programs, or applications for driving and controlling the display apparatus 100 according to control by the processor 910. According to an embodiment, the memory 990 may include a broadcast reception module, a channel control module, a volume control module, a communication control module, a voice recognition module, a motion recognition module, a light reception module, a display control module, an audio control module, an external input control module, a power control module, a power control module of an external device connected wirelessly (e.g., via Bluetooth), a speech database (DB), or a motion DB. The modules and DBs of the memory 990 may be implemented in the form of software in order to perform, in the electronic device 900, a broadcast reception control function, a channel control function, a volume control function, a communication control function, a voice recognition function, a motion recognition function, a light reception control function, a display control function, an audio control function, an external input control function, a power control function, or a power control function of an external device connected wirelessly (e.g., via Bluetooth). The processor 910 may perform respective functions using their corresponding software stored in the memory 990.

The block diagrams of the electronic devices 100 and 900 respectively described with reference to FIGS. 1 and 9 are provided for illustrations of the embodiments of the disclosure. Each of the components in the block diagrams may be integrated, added, or omitted according to the specifications of the electronic devices 100 and 900 that are actually implemented. In other words, two or more components may be combined into a single component, or a single component may be split into two or more components when necessary. Furthermore, functions performed in each block are intended to describe embodiments of the disclosure, and a specific operation or apparatus related to the functions does not limit the scope of the disclosure.

An operation method of an electronic device according to an embodiment of the disclosure may be implemented in the form of program instructions executable by various types of computers and may be recorded on computer-readable recording media. The computer-readable recording media may include program instructions, data files, data structures, etc. either alone or in combination. The program instructions recorded on the computer-readable recording media may be designed and configured specially for the disclosure or may be known to and be usable by one of skill in the art of computer software. Examples of the computer-readable recording media include magnetic media such as hard disks, floppy disks, and magnetic tapes, optical media such as compact disk-ROMs (CD-ROMs) and digital versatile disks (DVDs), magneto-optical media such as floptical disks, and hardware devices that are specially configured to store and perform program instructions, such as ROM, RAM, flash memory, etc. Examples of program instructions include not only machine code such as that generated by a compiler but also higher level language code executable by a computer using an interpreter or the like.

Furthermore, operation methods of an electronic device according to embodiments of the disclosure may be included in the form of a computer program product when provided. The computer program product may be traded, as a product, between a seller and a buyer.

The computer program product may include a software program and a computer-readable storage medium having stored thereon the software program. For example, the computer program product may include a product (e.g., a downloadable application) in the form of a software program electronically distributed by a manufacturer of an electronic device or through an electronic market (e.g., Google™ Play Store and App Store). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a client device, the computer program product may include a storage medium of the server or a storage medium of the client device. Alternatively, in a case where there is a third device (e.g., a smartphone) communicatively connected to the server or the client device, the computer program product may include a storage medium of the third device. Alternatively, the computer program product may include a software program itself that is transmitted from the server to the client device or the third device or that is transmitted from the third device to the client device.

In this case, one of the server, the client device, and the third device may execute the computer program product to perform methods according to embodiments of the disclosure. Alternatively, at least two of the server, the client device, and the third device may execute the computer program product to perform the methods according to embodiments of the disclosure in a distributed manner.

For example, the server (e.g., a cloud server, an artificial intelligence (AI) server, or the like) may execute the computer program product stored therein to control the client device communicatively connected to the server to perform the methods according to embodiments of the disclosure.

While embodiments of the disclosure have been particularly described, the embodiments of the disclosure are not to be construed as limiting the scope of the disclosure, and various changes and modifications made by those of ordinary skill in the art based on the basic concept of the disclosure also fall within the scope of the disclosure as defined by the following claims.

What is claimed is:

1. An electronic device comprising:
a memory storing one or more instructions;
a first processor configured to execute the one or more instructions stored in the memory;
a second processor; and
a communication interface,
wherein the first processor and the communication interface are connected via a universal serial bus (USB) interface, and the second processor and the communication interface are connected via a hardware (HW) wire,
wherein the second processor is configured to:
transmit, via the HW wire, state information indicating a state of the first processor to the communication interface; and
based on the first processor entering a suspend mode from a normal mode, change the state information from a first value to a second value,
wherein the communication interface is configured to, based on the state information being changed from the first value to the second value, disconnect the first processor from the communication interface by turning off power of the USB interface,
wherein the second processor is further configured to, based on the first processor entering the normal mode from the suspend mode, change the state information from the second value to the first value, and
wherein the communication interface is further configured to, based on the state information being changed from the second value to the first value, connect the first processor to the communication interface by turning on the power of the USB interface.

2. The electronic device of claim 1, wherein the communication interface is further configured to, based on the state information being changed from the first value to the second value, disable a transmission/reception port included in the USB interface.

3. The electronic device of claim 1, wherein the communication interface is further configured to, based on the state information being changed from the second value to the first value, enable a transmission/reception port included in the USB interface.

4. The electronic device of claim 1, wherein, based on cold booting being performed, the second processor is further configured to transmit a reset signal to the communication interface, and
wherein the first processor is further configured to execute the one or more instructions to connect the first processor to the communication interface via the USB interface by performing operations according to a first sequence.

5. The electronic device of claim 1, wherein, based on entering the normal mode from the suspend mode, the first processor is further configured to execute the one or more instructions to connect the first processor to the communication interface via the USB interface by performing operations according to a second sequence.

6. The electronic device of claim 1, wherein the first processor is further configured to execute the one or more instructions to:
set network information including wireless channel information;
based on the set wireless channel information corresponding to a first frequency, connect the first processor to the communication interface via the USB interface at a first physical layer (PHY) speed; and
based on the set wireless channel information corresponding to a second frequency, connect the first processor to the communication interface via the USB interface at a second PHY speed.

7. The electronic device of claim 6, further comprising a detector configured to receive a user input for setting the network information,
wherein the first processor is further configured to execute the one or more instructions to set the network information based on the user input for setting the network information.

8. The electronic device of claim 6, wherein the first frequency is 5 Gigahertz (GHz), and the second frequency is 2.4 GHz, and
wherein the first PHY speed is 5 Gigabits per second (Gbps), and the second PHY speed is 2.5 Gbps.

9. The electronic device of claim 1, wherein the first processor is further configured to execute the one or more instructions to:
identify information about a wireless channel currently connected to the communication interface;
based on the information about the wireless channel corresponding to a first frequency, connect the first processor to the communication interface via a first type of transmission/reception port included in the USB interface; and
based on the information about the wireless channel corresponding to a second frequency, connect the first processor to the communication interface via a second type of transmission/reception port included in the USB interface.

10. The electronic device of claim 9, wherein the first type of transmission/reception port is a transmission/reception port corresponding to a USB 2.0 standard, and the second type of transmission/reception port is a transmission/reception port corresponding to a USB 3.0 standard.

11. An operation method of an electronic device, the operation method comprising:
transmitting, by a second processor of the electronic device, state information indicating a state of a first processor of the electronic device to a communication interface of the electronic device via a hardware (HW) wire;
based on the first processor entering a suspend mode from a normal mode, changing the state information from a first value to a second value;
based on the state information being changed from the first value to the second value, disconnecting the first processor from the communication interface by turning off power of a universal serial bus (USB) interface;
based on the first processor entering the normal mode from the suspend mode, changing the state information from the second value to the first value; and
based on the state information being changed from the second value to the first value, connecting the first processor to the communication interface by turning on the power of the USB interface.

12. The operation method of claim 11, wherein the disconnecting the first processor from the communication interface comprises, based on the state information being changed from the first value to the second value, disabling a transmission/reception port included in the USB interface.

13. The operation method of claim 11, wherein the connecting the first processor to the communication interface comprises, based on the state information being changed from the second value to the first value, enabling a transmission/reception included in the USB interface.

14. The operation method of claim 11, further comprising:
based on cold booting being performed, transmitting, by the second processor, a reset signal to the communication interface; and
connecting, by the first processor, the first processor to the communication interface via the USB interface by performing operations according to a first sequence.

15. A non-transitory computer-readable recording medium having stored therein a program for performing the operation method of claim 11.

* * * * *